(12) United States Patent
Sawada

(10) Patent No.: US 7,775,562 B2
(45) Date of Patent: Aug. 17, 2010

(54) QUICK CONNECTOR

(75) Inventor: Kazunori Sawada, Mie (JP)

(73) Assignee: Nitta Moore Company, Osaka (JP)

( * ) Notice: Subject to any disclaimer, the term of this patent is extended or adjusted under 35 U.S.C. 154(b) by 0 days.

(21) Appl. No.: 12/124,308

(22) Filed: May 21, 2008

(65) Prior Publication Data

US 2008/0290654 A1 Nov. 27, 2008

(30) Foreign Application Priority Data

May 21, 2007 (JP) .............................. 2007-133775

(51) Int. Cl.
F16L 23/00 (2006.01)
(52) U.S. Cl. .......................... 285/406; 285/23; 285/325
(58) Field of Classification Search .................. 285/23, 285/325, 364, 406, 305, 319
See application file for complete search history.

(56) References Cited

U.S. PATENT DOCUMENTS

| | | | | |
|---|---|---|---|---|
| 295,151 A * | 3/1884 | Cummins | .................... | 285/325 |
| 823,346 A * | 6/1906 | Maxwell | ..................... | 285/325 |
| 2,357,755 A * | 9/1944 | Moll | ......................... | 220/3.94 |
| 2,870,863 A * | 1/1959 | Bramhall | ..................... | 55/376 |
| 3,479,069 A * | 11/1969 | Sedam | ........................ | 285/364 |
| 4,011,532 A * | 3/1977 | Williams et al. | ............. | 333/254 |
| 4,333,505 A * | 6/1982 | Jones et al. | ................. | 141/383 |
| 4,352,511 A * | 10/1982 | Ribble et al. | .................... | 285/91 |
| 5,383,689 A * | 1/1995 | Wolfe, Sr. | ................. | 285/124.3 |
| 5,820,168 A * | 10/1998 | De Giacomoni | ............ | 285/192 |
| 5,904,221 A * | 5/1999 | Breitweg et al. | ............. | 180/417 |
| 5,997,046 A * | 12/1999 | Hoeptner, III | ................. | 285/27 |
| 6,382,343 B1 * | 5/2002 | Engler | ......................... | 180/417 |
| 6,505,862 B1 * | 1/2003 | Stoll | .......................... | 285/205 |
| 6,651,851 B2 * | 11/2003 | Muderlak et al. | ........... | 222/333 |
| 7,314,238 B2 * | 1/2008 | Robert | ....................... | 285/103 |
| 7,509,956 B2 * | 3/2009 | Dombrowski | .......... | 128/202.27 |
| 2005/0087981 A1 * | 4/2005 | Yamada et al. | ................ | 285/81 |
| 2006/0082145 A1 * | 4/2006 | Steveley | ..................... | 285/305 |
| 2006/0152003 A1 * | 7/2006 | Slunick et al. | .............. | 285/364 |
| 2006/0157978 A1 * | 7/2006 | Szabo et al. | ................ | 285/305 |

FOREIGN PATENT DOCUMENTS

| | | |
|---|---|---|
| DE | 4217646 C1 | 9/1993 |
| JP | 2005-535845 A | 11/2005 |
| WO | 2004/016980 A1 | 2/2004 |

* cited by examiner

Primary Examiner—James M Hewitt
(74) Attorney, Agent, or Firm—Hahn & Voight PLLC; Roger C. Hahn

(57) ABSTRACT

A quick connector includes a female pipe having a flange in the outer peripheral part thereof, a male pipe having a retainer mounting part, and a retainer slidably mounted on the retainer mounting part of the male pipe to slide at a right angle to the axial direction of the male pipe, in which the female pipe and the male pipe are connected with each other by the retainer holding the flange of the female pipe, and the retainer is allowed to move from a temporarily fixed position to a completely pushed-in position on the retainer mounting part only when the female pipe and the male pipe are in a completely connected state, so that a worker can easily and reliably check whether the pipes are in an incompletely connected state or in a completely connected state by means of hand feeling only without relying on a visual check.

2 Claims, 9 Drawing Sheets

(a)

(b)          (c)

QUICK CONNECTOR

BACKGROUND OF THE INVENTION

1. Field of the Invention

The present invention relates to a quick connector used to connect pipes to each other in piping for transporting a fluid such as fuel and oil for an automobile.

2. Description of the Related Art

As a conventional quick connector, a connector as shown, for example, in FIGS. 1 to 5 of JP 2005-535845 A has been known. For such a quick connector, in connecting a first coupling piece 1 and a second coupling piece 2 to each other, one coupling piece is pushed in until the coupling piece reaches a position (until the coupling pieces 1 and 2 reach a completely connected state) at which a locking member 3 of a holder arm 6 provided in the first coupling piece 1 engages with a ring-shaped peripheral flange part (locking member 4) provided on the second coupling piece 2. Thereby, the coupling pieces are prevented from coming off, and the coupling pieces are connected each other (refer to FIG. 4 of JP 2005-535845 A).

For the quick connector of this type, in the case where the pushed amount of coupling piece is insufficient, and the engagement of the locking member 3 and the locking member 4 is imperfect (hereinafter, in this specification, the state in which the pushed amount of one coupling or pipe is insufficient is referred to as an "incompletely connected state"), the locking member 3 of the coupling piece 1 cannot hold the ring-shaped locking member 4 of the coupling piece 2 to restrain its movement, so that the coupling pieces 1 and 2 may come off from each other. If fluid flows through the coupling pieces 1 and 2 which are in the incompletely connected state, the fluid leaks from a gap between the coupling pieces 1 and 2 and there is a possibility to damage the pipes, piping equipment and the like. In the worst case, the leaking fuel ignites and causes explosion, which may lead to a serious accident. Therefore, to check whether or not the coupling pieces have been engaged with each other in the state in which the coupling pieces are reliably prevented from coming off and have been pushed into completely until the locking members 3 and 4 engage with each other is very important for a person who uses a connector of this type (hereinafter, in this specification, the state in which one of the coupling pieces or pipes is pushed into the other completely is referred to as a "completely connected state").

The conventional quick connector as described above, however, has problems described below. When the worker checks whether or not the coupling piece are pushed into each other sufficiently until the locking members 3 and 4 reach in the completely connected state, the worker must check the pushed amount by bringing his/her face close to the coupling piece to watch it carefully, or must try to check whether or not the coupling pieces are actually pulled away from each other by pulling the coupling piece by his/her hand. And such checking work is very troublesome. In particular, in the case where machines and parts are complicatedly laid out, or in the case where the coupling pieces are placed at a narrow place, the worker cannot bring his/her face close to the coupling piece, and also cannot reach his/her hand to the coupling piece. Therefore, in a narrow place, the worker needs to use a mirror to visually check the pushed amount of the coupling pieces, or use a fiber camera and a monitor to display the coupling pieces, and these works for checking the connected state is not easy. Also, since there is no much difference in the position of the locking member 3 of the above-described conventional quick connector regardless of whether the coupling pieces 1 and 2 are in the incompletely connected state or in the completely connected state, it is very difficult for workers wearing a hand protector such as leather gloves or cotton work gloves to exactly determine whether or not the coupling pieces are in the completely connected state by means of hand feeling only. In particular, in the case where a seal or an O-ring for improving the fluid tightness is provided at the location where the coupling pieces are engaged with each other, it becomes hard to connect the coupling pieces with each other. Therefore, the worker may mistake the engagement in the incompletely connected state for the completely connected state.

SUMMARY OF THE INVENTION

Accordingly, an object of the present invention is to provide a quick connector in which the worker can easily and reliably check whether the coupling pieces (pipes) are in an incompletely connected state or in a completely connected state by means of hand feeling only without relying on a visual check.

To achieve the above object, a quick connector of this invention includes a female pipe having a flange in the outer peripheral part thereof, a male pipe having a retainer mounting part and a retainer slidably mounted on the retainer mounting part of the male pipe to slide at a right angle to the axial direction of the male pipe. The female pipe and the male pipe are connected with each other by the retainer which holds the flange of the female pipe. In this quick connector, the retainer is allowed to move from a temporarily fixed position to a completely pushed-in position on the retainer mounting part only when the female pipe and the male pipe are in a completely connected state.

Another example of a quick connector of this invention includes a male pipe having a flange in the outer peripheral part thereof, a female pipe having a retainer mounting part and a retainer slidably mounted on the retainer mounting part of the female pipe to slide at a right angle to the axial direction of the male pipe. The male pipe and the female pipe are connected with each other by the retainer which holds the flange of the male pipe. In this quick connector, the retainer is allowed to move from a temporarily fixed position to a completely pushed-in position on the retainer mounting part only when the male pipe and the female pipe are in a completely connected state.

In the above quick connectors, the retainer mounting part may be provided with a protrusion piece for preventing the retainer from moving backward, so that the retainer in the temporarily fixed position is movable only toward the completely pushed-in position when the male pipe and the female pipe are in a completely connected state.

DETAILED DESCRIPTION OF THE PREFERRED EMBODIMENTS

Preferred embodiments of a quick connector in accordance with the present invention will now be described in detail with reference to the accompanying drawings.

Figure 3:
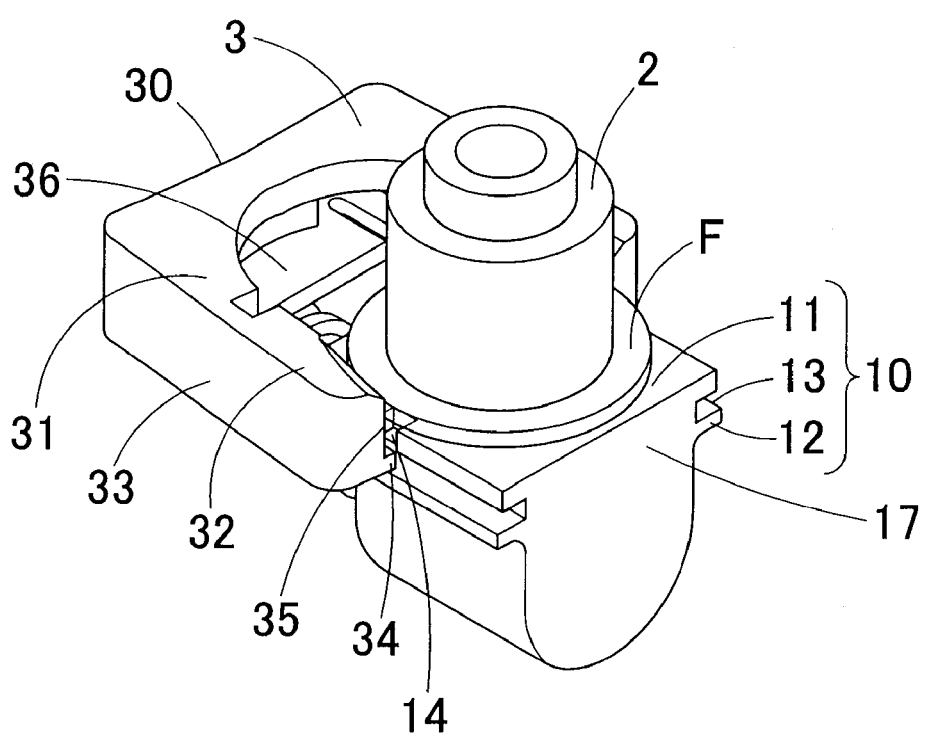
FIG. 3 is a perspective view showing a state in which a female pipe is connected with respect to the retainer at a temporarily fixed position shown in FIG. 2.
Figure 4:
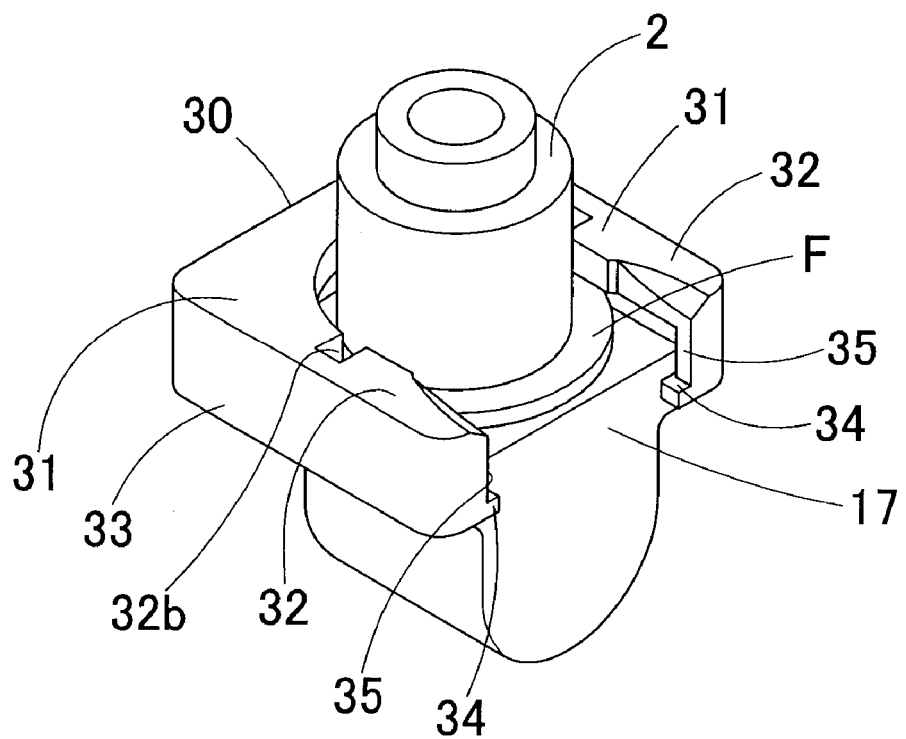
FIG. 4 is a perspective view showing a state in which the retainer is located at a completely pushed-in position.
Figure 7:
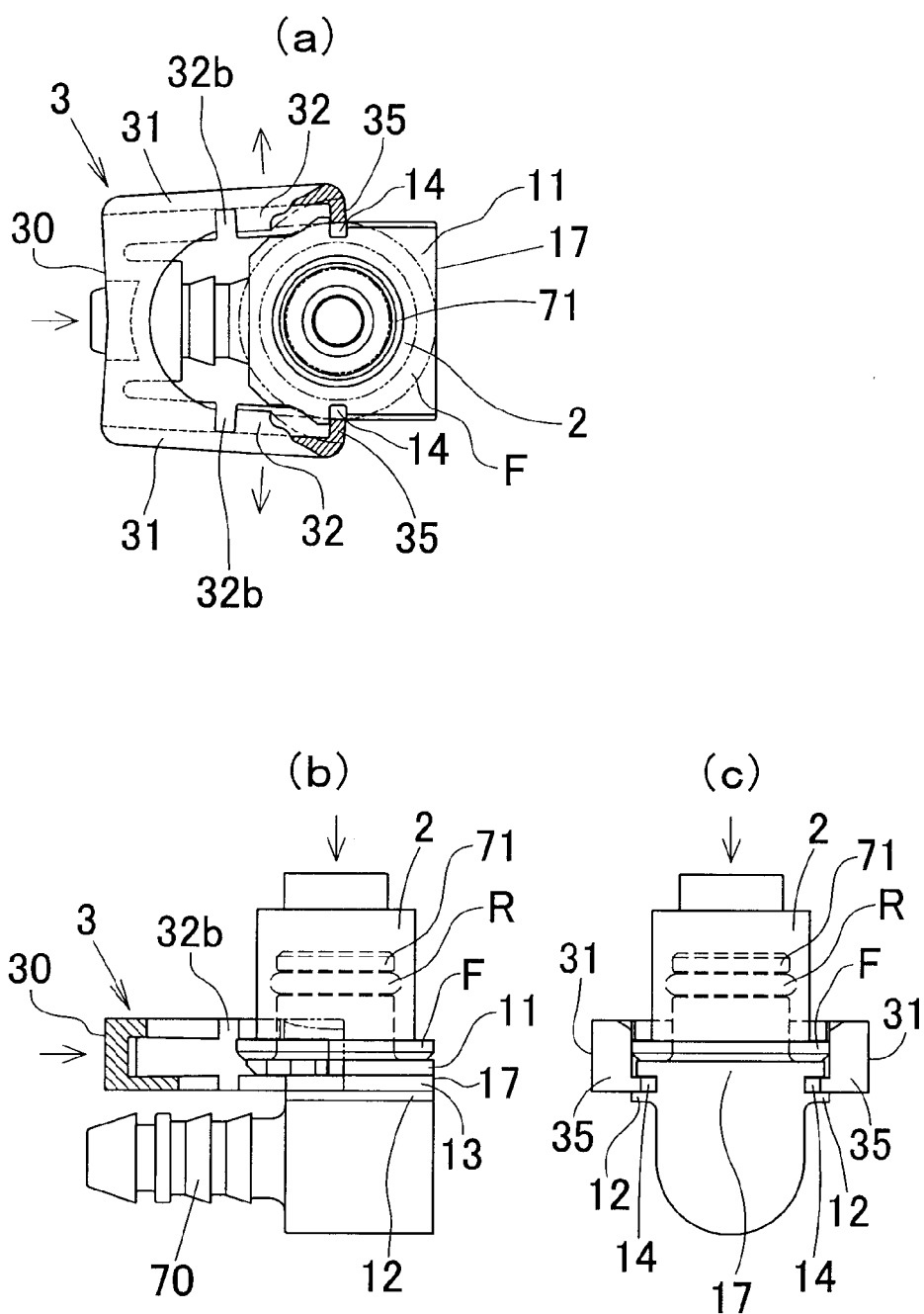
FIG. 7(*a*) is a top view of components in the state shown in FIG. 3, FIG. 7(*b*) is a side view of components in the state shown in FIG. 3, and FIG. 7(*c*) is a front view of components in the state shown in FIG. 3.
Figure 8:
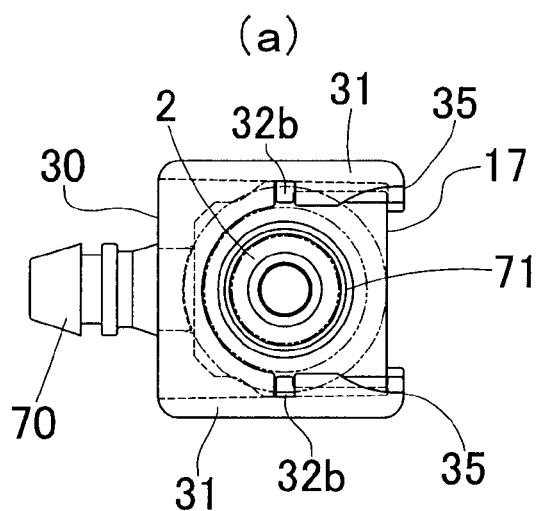
FIG. 8(*a*) is a top view of components in the state shown in FIG. 4, FIG. 8(*b*) is a side view of components in the state shown in FIG. 4, and FIG. 8(*c*) is a front view of components in the state shown in FIG. 4.
Figure 8:
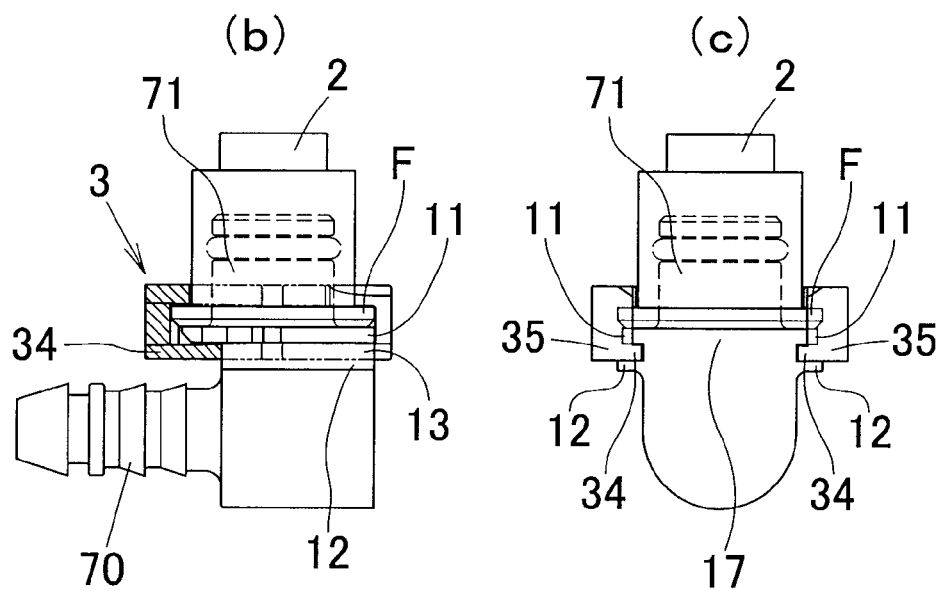

For this quick connector, only in the case where a female pipe 2 and a male pipe 1 are in a completely connected state as shown in FIG. 3 or 7, the temporarily fixed state of a retainer 3 is released, and therefore the retainer 3 can be pushed in from the temporarily fixed position on a retainer mounting seat 10 to a completely pushed-in position (refer to FIG. 4 or 8). At the position at which the retainer 3 is completely pushed in, a flange (F) of the female pipe 2 is held and restrained by the retainer 3, by which the female pipe 2 and the male pipe 1 are held in a state of being prevented from coming off.

Figure 2:
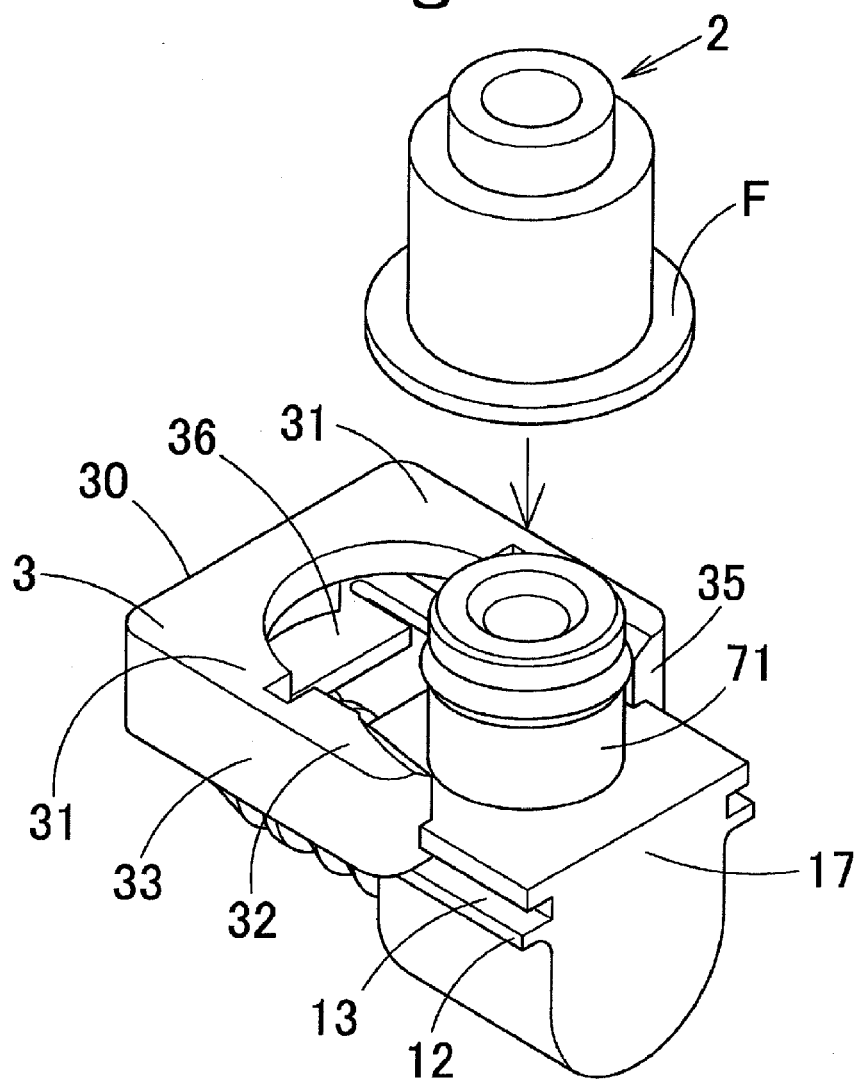
FIG. 2 is a perspective view showing a state in which a retainer is located at a temporarily fixed position on a retainer mounting seat of a male pipe.
Figure 6:
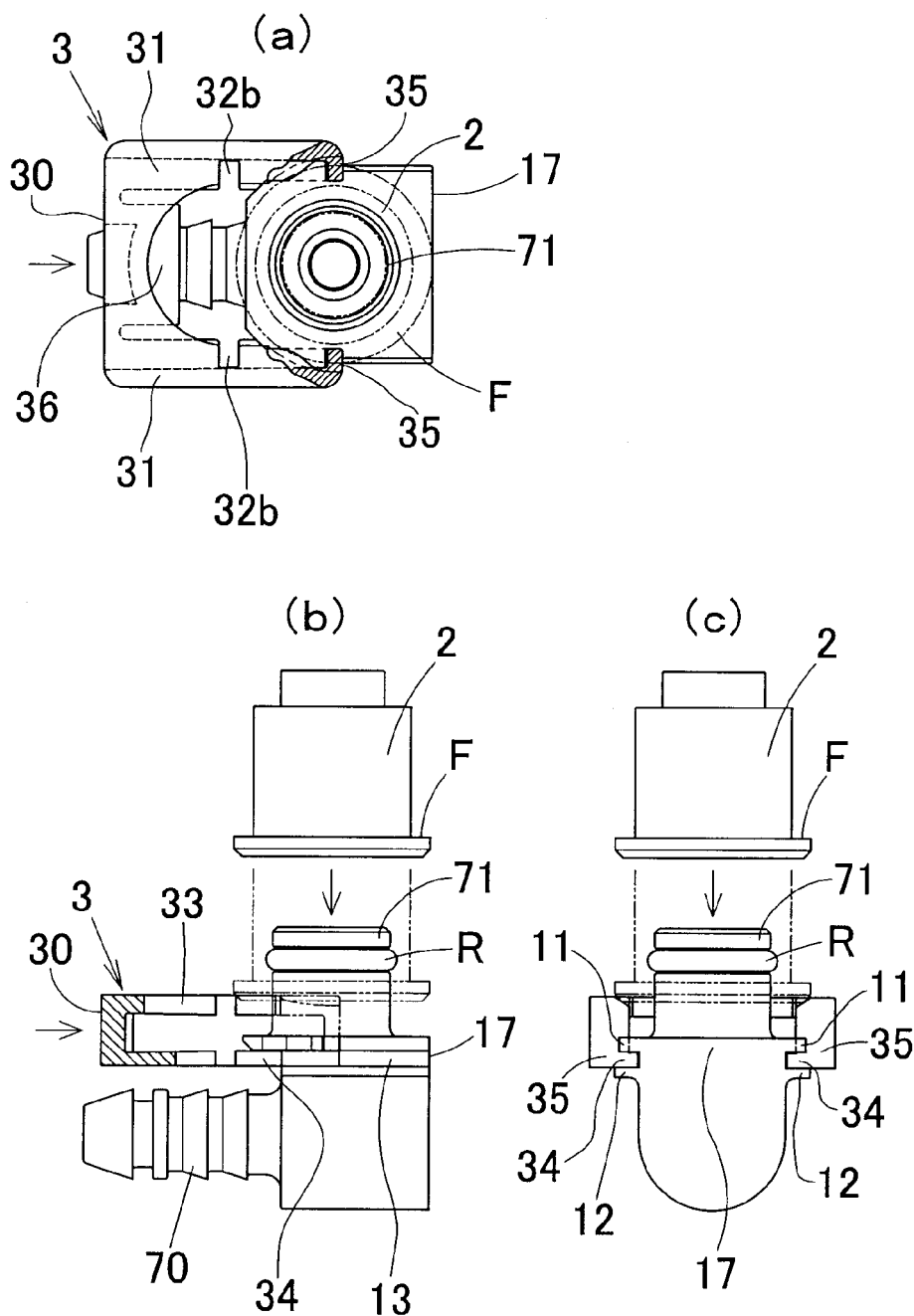
FIG. 6(*a*) is a top view of components in the state shown in FIG. 2, FIG. 6(*b*) is a side view of components in the state shown in FIG. 2, and FIG. 6(*c*) is a front view of components in the state shown in FIG. 2.

In this specification, a position (state) at which the retainer 3 is incapable of sliding on the retainer mounting seat 10 in the state in which locking pieces 35 of the retainer 3 are fitted in temporarily fixing grooves 14 provided in a flange part 11 of the retainer mounting seat 10 as shown in FIG. 2 or 6 is referred to as a "temporarily fixed position" (temporarily fixed state). Also, a position (state) at which the retainer 3 is incapable of sliding on the retainer mounting seat 10 in the state in which the locking pieces 35 of the retainer 3 engage with an engagement wall 17 constituting an end wall at the tip end of the retainer mounting seat 10 as shown in FIG. 4 or 8 is referred to as a "completely pushed-in position" (completely pushed-in state).

Figure 1:
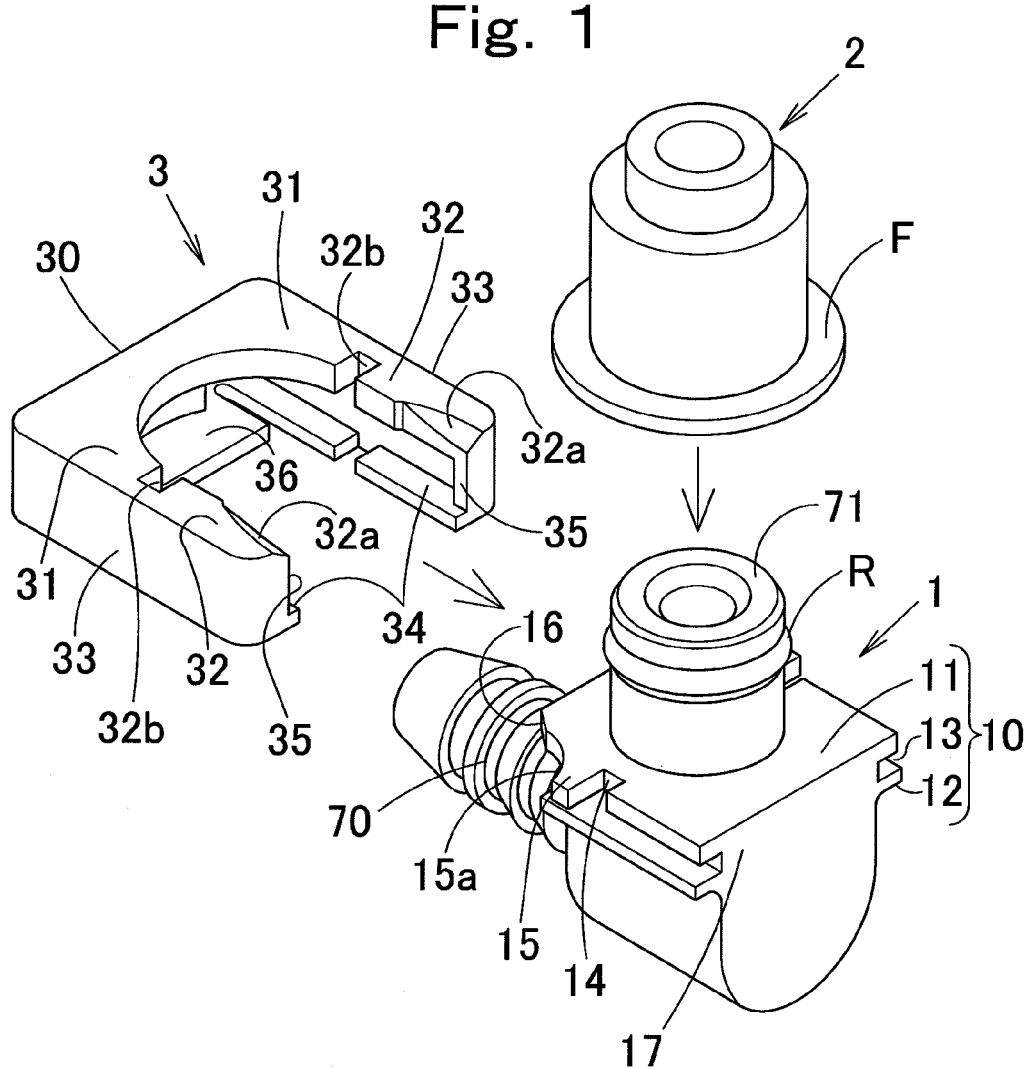
FIG. 1 is an exploded perspective view of components of a quick connector of an embodiment according to the present invention.

The male pipe 1, which is used to mainly transport a liquid, is formed of a resin (for example, polyamide resin) or a metal. As shown in FIG. 1, the male pipe 1 is an L-shaped joint comprised of a bamboo shoot shaped joint part 70 on the side to which one resin tube or hose tube is attached and a fluid passage 71 provided at right angles to the axis line of the bamboo shoot shaped joint part 70.

At the base of the fluid passage 71, the retainer mounting seat 10 is provided so that the retainer 3, described later, can be mounted slidably.

In the outer peripheral part of the bamboo shoot shaped joint part 70, a plurality of annular raised or expanded parts are provided. Therefore, the resin tube or hose tube can be connected reliably in a fluid-tight state by mounting an O-ring or seal ring onto the annular expanded parts. Also, an annular groove is provided in the outer peripheral part of the fluid passage 71 of the male pipe 1 as well. Therefore, the female pipe 2 can be connected reliably in a fluid-tight state by mounting an O-ring (R) in this groove.

Figure 5:
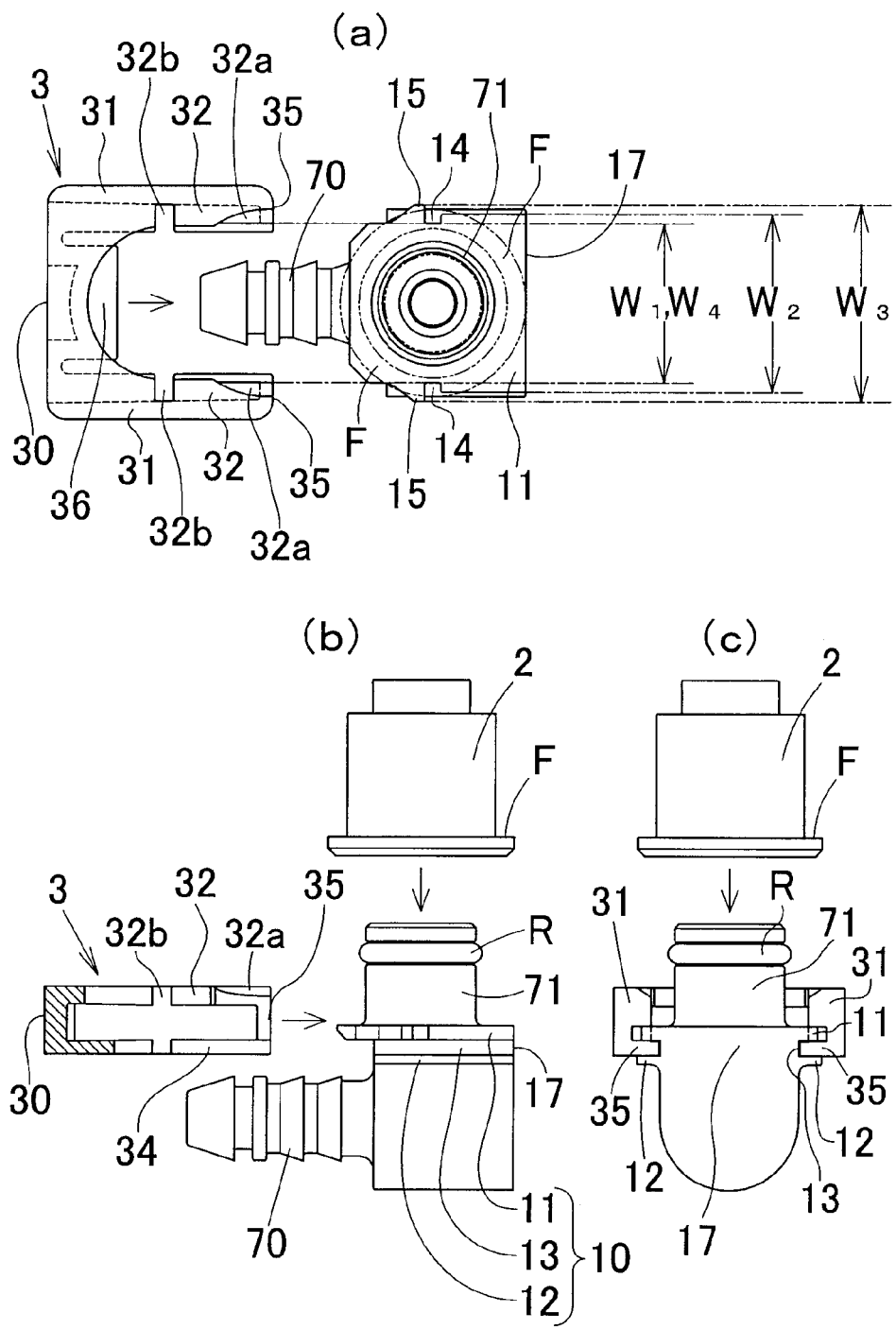
FIG. 5(*a*) is a top view of components in the state shown in FIG. 1, FIG. 5(*b*) is a side view of components in the state shown in FIG. 1, and FIG. 5(*c*) is a front view of components in the state shown in FIG. 1.

As shown in FIG. 1 or 5, the retainer mounting seat 10 of the male pipe 1 has the substantially square-shaped flange part 11 formed integrally in a portion in which the fluid passage 71 is connected to the body part of the male pipe 1. Also, on both sides of the body part of the male pipe 1, a slider groove 13 is formed by the flange part 11 and a slider piece 12 provided under the side part of the flange part 11 so as to extend in parallel with the side face of the flange part 11 so that the retainer 3, described later, slidably fits in the slider grooves 13.

In the outer peripheral part of the flange part 11, there are provided the temporarily fixing grooves 14 and protrusion pieces 15 for preventing the retainer 3 from moving backward. The locking pieces 35 of the retainer 3, described later, are engaged with the temporarily fixing grooves 14 so that the retainer 3 is held at the temporarily fixed position (refer to FIG. 2 or 6) of the retainer mounting seat 10. End walls 16 and constitution walls 15*a* on the protrusion piece 15 of the retainer mounting seat 10, provided on the insertion side of the retainer 3, are respectively formed into a tapered shape to facilitate the insertion of the retainer 3.

The width (W1) between the temporarily fixing grooves 14 provided in the outer peripheral parts of the flange part 11 is set so as to be narrower than the outside diameter of the flange (F) of the female pipe 2 as shown in FIG. 5(*a*).

The width (W2) between the side walls of the flange part 11 where the temporarily fixing grooves 14 are provided, is set so as to be equal to or slightly narrower than the outside diameter of the flange (F) of the female pipe 2 as shown in FIG. 5(*a*).

Further, the width (W3) between the protrusion pieces 15 for preventing the retainer 3 from moving backward, which are provided in the outer peripheral part of the flange part 11, is set so as to be wider than the outside diameter of the flange (F) of the female pipe 2 as shown in FIG. 5(*a*).

The female pipe 2 is an annular member that is made of a metal or a resin like the male pipe 1. As shown in FIG. 1, at one end in the outer peripheral part of the female pipe 2, a flange (F), which is an annular enlarged diameter part, is integrally formed. To the other end part of the female pipe 2, the mating resin tube or hose tube, not shown, is connected. In connecting the female pipe 2 to the above-described male pipe 1, the insertion hole of the female pipe 2 is inserted onto the fluid passage 71 of the male pipe 1 from the flange (F) side of the female pipe 2 (arrow mark in FIG. 1), and the flange (F) is held and restrained by the retainer 3 in this state, by which the female pipe 2 is prevented from coming off the male pipe 1 (refer to FIG. 4).

The retainer 3 is a substantially U-shaped resin-made member formed integrally, and includes an end wall 30 and first and second leg parts 31 extending substantially in parallel with each other from the end wall 30 as shown in FIG. 1 or 5. The first and second leg parts 31 are each comprised of a lock wall 32 constituting the top surface, a side wall 33 constituting the side surface, a slide wall 34 constituting the bottom surface and a locking piece 35 at the tip end and a groove is formed inside the leg part 31.

The width (W4) between the locking pieces 35 of the first and second leg parts 31 is set so as to be equal to or slightly narrower than the width (W1) between the temporarily fixing grooves 14 provided in the outer peripheral part of the flange part 11 as shown in FIG. 5(*a*).

The inside face of the lock wall 32 is formed into a curved shape together with the inside surface of the end wall 30, as shown in FIG. 5(*a*), to hold the outer peripheral part of the female pipe 2 at the completely pushed-in position of the retainer 3. A top surface tip end part 32a of the lock wall 32 with which the flange (F) of the female pipe 2 comes into contact at the time of connecting with the male pipe 1 is formed into a tapered shape to facilitate the insertion of the female pipe 2.

Near the central parts of the lock walls 32 and the slide walls 34, notches 32b are provided as shown in FIG. 1 or 5. In the case where the female pipe 2 and the male pipe 1 are in the completely connected state, the notches 32b assist the leg parts 31 of the retainer 3 at the temporarily fixed position to enlarge in diameter. As the female pipe 2 is pushed onto the male pipe 1 for the completely connected state, the leg parts 31 of the retainer 3 are gradually widened outwardly by the pushing action of the female pipe 2. By providing the notches 32b, the elasticity of the leg parts 31 is increased, so that the connection of the female pipe 2 to the male pipe 1 is facilitated, and the strength of the retainer 3 can be increased.

As shown in FIG. 1, on the end wall 30 of the retainer 3, there is provided a protrusion piece 36 projecting to the inside on the surface flush with the slide walls 34.

In connecting the above-described components of the quick connector in accordance with the present invention, first, as shown in FIG. 2 or 6, the locking pieces 35 are fitted in the temporarily fixing grooves 14 in the retainer mounting seat 10 of the male pipe 1 so that the retainer 3 is located at the temporarily fixed position on the retainer mounting seat 10. At this time, since the end walls 16 of the retainer mounting seat 10 and the constitution walls 15a of the protrusion pieces 15 for preventing backward movement are formed into a tapered shape, the fitting work is easy to perform. Also, in this state, the slide walls 34 of the retainer 3 are fitted in the slider grooves 13 in the retainer mounting seat 10 (refer to FIG. 6(b) or 6(c)).

When the retainer 3 is at the temporarily fixed position, due to the engagement of the locking pieces 35 with the temporarily fixing grooves 14, the retainer 3 is restrained from moving forward and backward. Also, due to the engagement of the slide walls 34 with the slider grooves 13, the retainer 3 is restrained from coming off upwardly nor downwardly. Therefore, the retainer 3 is prevented from being dropped inadvertently from the retainer mounting seat 10, and also the retainer 3 is prevented from being lost. Also, at the time of delivery of these members from the manufacturer to the customer, it is possible to deliver the retainer 3 in a state of being temporarily fixed to the retainer mounting seat 10. Therefore, since there is no need to engage the retainer 3 with the retainer mounting seat 10 in front of the customer, the labor and time at the customer site are saved, and operations such as controlling the number of products to be delivered, delivering the products and the inventory control are facilitated.

Next, in the state in which the retainer 3 is at the temporarily fixed position of the retainer mounting seat 10, the female pipe 2 is pushed onto the fluid passage 71 of the male pipe 1 as shown in FIG. 3 or 7. At this time, the pushing operation of the female pipe 2 is performed until the bottom surface part of the flange (F) of the female pipe 2 comes into contact with the flange part 11 of the retainer mounting seat 10, that is, until the female pipe 2 is completely connected to the male pipe 1 as shown in FIG. 7(b) or 7(c). Since the width (W1) between the temporarily fixing grooves 14 provided in the outer peripheral parts of the flange part 11 has been set so as to be narrower than the outside diameter of the flange (F) of the female pipe 2 as shown in FIG. 5(a), the width (W4) between the locking pieces 35 of the retainer 3 fitted in the temporarily fixing grooves 14 is also set so as to be narrower than the outside diameter of the flange (F) of the female pipe 2. Therefore, as the female pipe 2 is pushed down, the first and second leg parts 31 of the retainer 3 are widened outwardly against the elastic force thereof (refer to FIG. 7(a)).

When the first and second leg parts 31 of the retainer 3 are widened outwardly, the locking pieces 35 of the retainer 3 are disengaged from the temporarily fixing grooves 14 in the retainer mounting seat 10. Here, since the width (W2) of the side wall constituting the flange part 11 has been set so as to be equal to or slightly narrower than the outside diameter of the flange (F) of the female pipe 2, the retainer 3 become free to move forward (toward the completely pushed-in direction).

However, even in this case, since the width (W3) between the protrusion pieces 15 for preventing the retainer 3 from moving backward, which are provided in the outer peripheral part of the flange part 11, has been set so as to be wider than the outside diameter of the flange (F) of the female pipe 2, the engagement of the locking pieces 35 with the protrusion pieces 15 is not released, and therefore the retainer 3 is still prevented from moving rearward (backward).

After the engagement of the locking pieces 35 of the retainer 3 with the temporarily fixing grooves 14 in the retainer mounting seat 10 has been released as described above, the retainer 3 is pushed in from the temporarily fixed position of the retainer mounting seat 10 to the completely pushed-in position as shown in FIG. 4 or 8. At the time of pushing-in operation, the slide walls 34 of the retainer 3 slide in the slider grooves 13 in the retainer mounting seat 10. When the locking pieces 35 of the retainer 3 are pushed in until the locking pieces 35 go beyond the engagement wall 17 of the retainer mounting seat 10, the first and second leg parts 31 of the retainer 3, which have been widened outwardly by the flange (F) of the female pipe 2, are restored to their original form by their elasticity, so that the locking piece 35 is engaged with the engagement wall 17 of the retainer mounting seat 10 in the completely pushed-in state.

In the completely pushed-in state (completely pushed-in position) of the retainer 3, by the engagement of the locking pieces 35 with the engagement wall 17 of the retainer mounting seat 10, the retainer 3 is prevented from coming off the retainer mounting seat 10 (male pipe 1) (from moving rearward). Also, by the engagement of the slide wall 34 of the retainer 3 with the slider groove 13 in the retainer mounting seat 10, the retainer 3 is prevented from coming off the retainer mounting seat 10 (being pulled out upwardly and downwardly). Further, by the engagement of the protrusion piece 36 of the retainer 3 with the rear end part of the flange part 11 of the retainer mounting seat 10, the retainer 3 is prevented from coming off the retainer mounting seat 10 (from moving forward).

Also, by the engagement of the flange (F) of the female pipe 2 with the retainer 3 within the first and second leg parts 31 (the inside of the lock wall 32) and the end wall 30, the female pipe 2 is prevented from coming off the fluid passage 71 of the male pipe 1.

As described above, in the above-described embodiment of the present invention, whether the female pipe 2 and the male pipe 1 are in the incompletely connected state or in the completely connected state can be checked easily and reliably by hand feeling only without relying on a visual check by feeling the amount of displacement (position change) of the retainer 3 in the retainer mounting seat 10 from the temporarily fixed position to the completely pushed-in position. That is to say, when the female pipe 2 and the male pipe 1 are in the incompletely connected state, the engagement of the locking piece 35 of the retainer 3 with the temporarily fixing groove 14 in the retainer mounting seat 10 is not released, and therefore the retainer 3 does not move from the temporarily fixed position. Therefore, the worker recognizes that the female pipe 2 and the male pipe 1 are in the incompletely connected state. Inversely, when the female pipe 2 and the male pipe 1 are in the completely connected state, the engagement of the locking piece 35 of the retainer 3 with the temporarily fixing groove 14 in the retainer mounting seat 10 is released, and therefore the retainer 3 is pushed in from the temporarily fixed position to the completely pushed-in position. Therefore, due to the position change of the retainer 3, the worker can recognize that the female pipe 2 and the male pipe 1 are in the completely connected state.

Also, in the above-described embodiment, since the contact area of the flange (F) of the female pipe 2 and the retainer 3 is large when the retainer 3 is in the completely pushed-in state, the tensile strength of this quick connector is high, and the female pipe 2 can completely be prevented from coming off the male pipe 1, thereby this type of quick connector is much safer to use. In the above-described conventional quick connector, the contact area of the locking members 3 and 4 is relatively small (see the FIG. 4 of JP 2005-535845 A), and therefore the tensile strength thereof is low.

Other Embodiments

Figure 9:
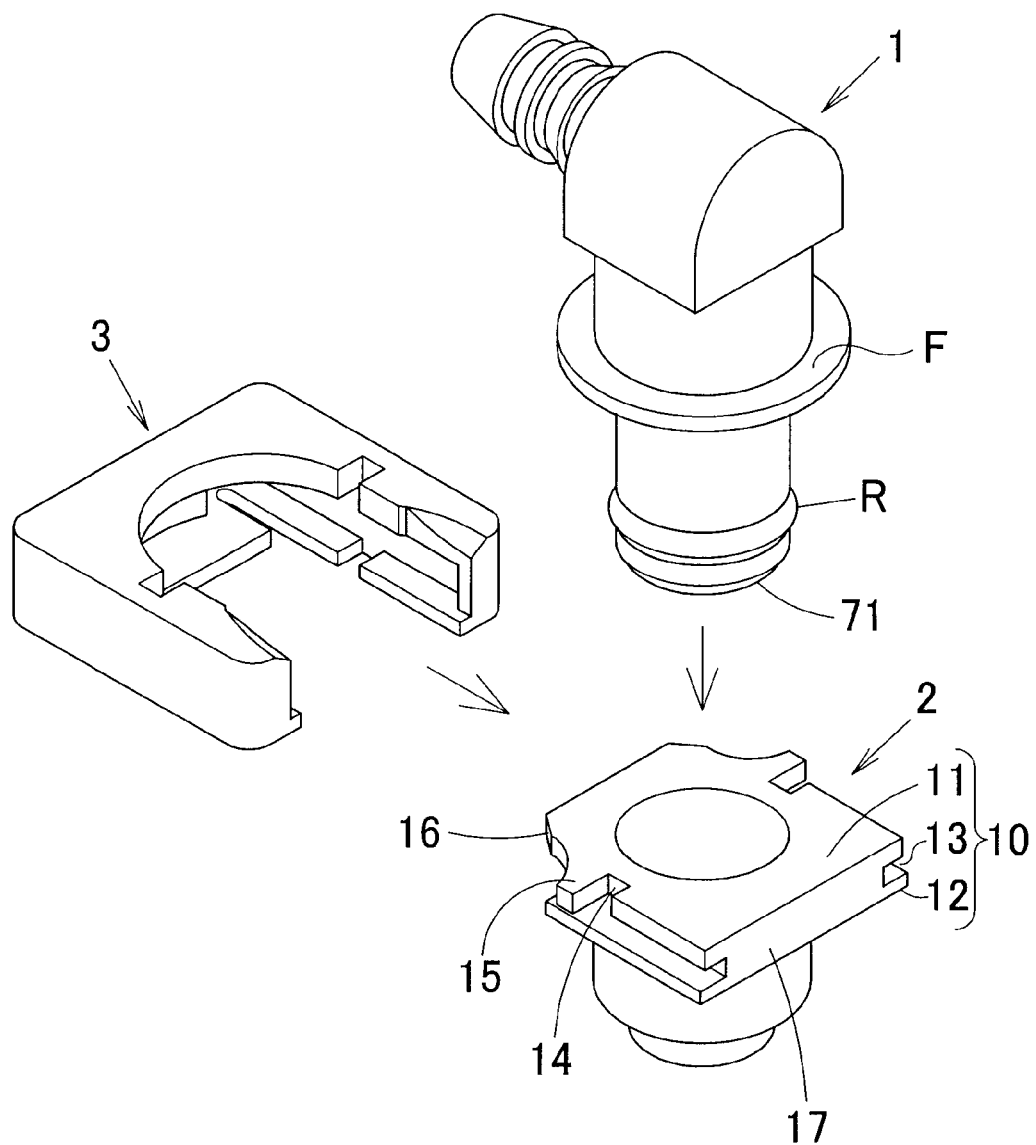
FIG. 9 is an exploded perspective view of components of a quick connector of another embodiment according to the present invention.

In the above-described embodiment, the flange (F) is formed in the outer peripheral part of the female pipe 2, and the retainer mounting seat 10 is formed in the male pipe 1. However, inversely, it is also possible to form the flange (F) in the outer peripheral part of the male 1 and to form the retainer mounting seat 10 in the female pipe 2 as shown in FIG. 9.

Also, in the above-described embodiment, the male pipe 1 is an L-shaped joint provided with the bamboo shoot shaped joint part 70 and the fluid passage 71. However, the configuration of the male pipe 1 is not limited to this configuration. The male pipe 1 may be a joint having a plurality of circuits such as a T-shaped, F-shaped, or cross-shaped joint.

Those skilled in the art will appreciate that various adaptation and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A quick connector comprising:
   a female pipe having a flange on an outer peripheral part thereof;
   a male pipe having a retainer mounting part defining sliding grooves and fixing grooves; and
   a U-shaped retainer slidably mounted on the retainer mounting part of the male pipe to slide at a right angle to the axial direction of the male pipe;
   wherein the female pipe and the male pipe are connected with each other by the retainer which holds the flange of the female pipe; and
   wherein the retainer is allowed to move from a temporarily fixed position in which the retainer is mounted in the sliding and fixing grooves, to a completely pushed-in position on the retainer mounting part only when the female pipe and the male pipe are in a completely connected state.

2. The quick connector according to claim 1, wherein the retainer mounting part has a protrusion piece for preventing the retainer from moving backward, so that the retainer in the temporarily fixed position is movable only toward the completely pushed-in position when the female pipe and the male pipe are in the completely connected state.

* * * * *